(12) United States Patent
Yokoyama et al.

(10) Patent No.: US 6,343,000 B1
(45) Date of Patent: Jan. 29, 2002

(54) IGNITION DEVICE AND METHOD FOR MANUFACTURING THEREOF

(75) Inventors: Ryosuke Yokoyama; Toshimi Endou, both of Asahikawa (JP)

(73) Assignee: Toshiba Hokuto Electronics Corporation (JP)

( * ) Notice: Subject to any disclaimer, the term of this patent is extended or adjusted under 35 U.S.C. 154(b) by 0 days.

(21) Appl. No.: 09/293,785

(22) Filed: Apr. 20, 1999

(30) Foreign Application Priority Data

Apr. 21, 1998 (JP) .......................................... 10-110347

(51) Int. Cl.[7] ................................................ F23Q 3/00
(52) U.S. Cl. .................. 361/247; 102/202.4; 102/202.5; 102/202.7
(58) Field of Search ..................... 361/247; 102/202.4, 102/202.5, 202.7; 307/10.1, 10.2; 29/622

(56) References Cited

U.S. PATENT DOCUMENTS

| | | | |
|---|---|---|---|
| 3,831,523 A | * 8/1974 | Thomas et al. | ........... 102/28 R |
| 3,971,320 A | 7/1976 | Lee | |
| 4,296,398 A | * 10/1981 | McGalliard | ................. 337/297 |
| 4,944,225 A | * 7/1990 | Barker | .................... 102/202.5 |
| 5,080,016 A | * 1/1992 | Osher | ....................... 102/202.7 |
| 5,254,838 A | 10/1993 | Hasegawa et al. | |
| 5,404,263 A | 4/1995 | Graves et al. | |
| 5,431,104 A | * 7/1995 | Barker | ........................ 102/312 |
| 5,471,193 A | * 11/1995 | Peterson et al. | ............ 340/438 |
| 5,544,585 A | * 8/1996 | Duguet | ..................... 102/202.5 |

FOREIGN PATENT DOCUMENTS

JP 64-75896 3/1989

\* cited by examiner

*Primary Examiner*—Fritz Fleming
*Assistant Examiner*—Vaughn Marquis
(74) *Attorney, Agent, or Firm*—Blank Rome Comisky & McCauley LLP

(57) ABSTRACT

This invention provides highly reliable ignition device with superior ease of mass production, and a method for the manufacture thereof.

An ignition device is constructed by taking a heating element 40 comprising a bridge element 25 composed of a heating bridge wire 25c which is heated by the passage of an electric current and heating electrodes 25a and 25b located at both ends thereof, and a flexible insulating sheet 26 which carries this bridge element; then welding this heating element to stem electrodes, formed in the stem, via connection guides which are openings provided in the insulating sheet at the location of the heating electrodes.

12 Claims, 4 Drawing Sheets

IGNITION DEVICE AND METHOD FOR MANUFACTURING THEREOF

BACKGROUND OF THE INVENTION

1. Field of the Invention

This invention relates to an ignition device of header assemblies used for example in an inflator system employed in automobile safety equipment, and the like, and methods of manufacture thereof.

2. Description of the Prior Art

Various safety devices, such as air bags and seat belt pretensioners, have been implemented to protect automobile drivers and passengers. In the event of an accident the life-saving rate of these safety devices is high, and the proportion of vehicles to which they are fitted is increasing.

However, it is essential that when an accident has not occurred, automobile safety devices such as air bags remain in a state such that they will function correctly for the long period of time that elapses until the vehicle is disposed of. Accordingly, high reliability is desirable. It is also essential that such safety devices operate rapidly and correctly if an accident does occur.

For reasons such as these, explosive materials are widely used to activate automobile safety devices, and the like. Furthermore, electrical header assemblies are often used to ignite the explosive material.

Taking the air bag as an example of an automobile safety device, conventional header assemblies will now be explained with reference to FIG. 7. The item labelled 71 is a cylindrical case sealed at one end, and an eyelet 72 has been fitted into the lower half of the inside of the cylindrical case 71. Ignitor charge 73 has been loaded into the space above the eyelet 72, and a pair of stem electrodes 74a and 74b are provided that pierce through the eyelet. Both ends of the bridge element 75 are electrically connected to top surface of the stem electrodes 74a and 74b by welding. The bridge element 75 is in close contact with the ignitor charge 73. Insulating material 76 is placed around the stem electrodes 74a and 74b, so that the stem electrodes 74a and 74b do not come into contact with each other.

In the above construction, if a vehicle fitted with the air bag is involved in a collision, electric current flows in the stem electrodes 74a and 74b due to a collision detection signal. This current flows through the bridge element 75, and the bridge element 75 heats up and fuses. The ignitor charge 73 is ignited by the thermal energy released, gas-producing material caused to react, and the safety device caused to operate.

Prior art header assemblies have used resistance wire as the bridge element, as in U.S. Pat. No. 3,971,320. Furthermore, by means of resistance welding, and the like, this resistance wire has been connected between stem electrodes exposed on the stem surface. The dimensions of the resistance wire have been selected in accordance with the required ignition properties and the power supply used to cause current to flow between the stem electrodes. For example, wire with a diameter of several tens of micrometres, and a length of several millimetres has been used.

However, variations in welding strength occur when the wire bridge element and the stem electrodes are welded together. In addition, the stress involved when bridge element is brought into close contact with the ignitor charge 73 varies. As a result, with prior art header assemblies factors which prevent the provision of uniform operating properties occur within the manufacturing processes, and the like, and this decreases reliability.

It has been proposed, as in U.S. Pat. No. 5,404,263, that the occurrence of stress be prevented by making these stem surfaces flush. However, the bridge element is welded directly to the electrodes.

In order to stabilise the operating properties of the bridge element, it is important to maintain a constant distance between the welded parts at both ends of the bridge element welded to the stem electrodes, and this requires high-precision control of the welded parts of the bridge element. However, it is very difficult to control the precision of welding points because the bridge wire is both thin and short. Furthermore, the control needed for precision would result in a reduction in the ease of mass production.

In addition, a construction has been proposed, as in Japanese Patent Laid-open 64-75896, wherein a thin deposited film is formed as the heating body, by sputtering, vapour deposition, or the like, onto a ceramic substrate. However, this has disadvantages such as the fact that junction with the stem electrodes is achieved by soldering, electrode caulking, and the like, and because the thin film is formed by film deposition, it is impossible to produce a heating body with a precise resistance value.

SUMMARY OF THE INVENTION

This invention has as its object the provision of a highly reliable easily mass produced ignition device and a method of manufacture thereof.

This invention has as its object the provision of an ignition device, ignition device provided with a bridge element positioned on top of a stem, and heating carried out by passing an electric current through this bridge element from stem electrodes provided in the stem, in which the device comprising:

a stem comprising at least two mutually separated stem electrodes and an insulating element provided between these stem electrodes to insulate and maintain the stem electrodes and to form a stem surface in conjunction with the ends of the stem electrodes; and a heating element comprising a bridge element provided with a heating bridge wire and heating electrodes positioned at the both ends of the heating bridge wire, and a flexible insulating sheet positioned on top of the stem surface, on which the bridge element is supported, and in which openings or cut-out areas are formed as connecting guides corresponding to the position of the heating electrodes, wherein the connecting guides of the flexible insulating sheet are aligning with the ends of these stem electrodes, and the heating electrodes of the bridge element are electrically connected to the ends of the stem electrodes.

In addition, this invention has as its object the provision of a method for manufacturing an ignition device used in an inflator system, comprising a step in which a metal resistor sheet is joined to a flexible insulating sheet in which a plurality of openings spaced to correspond to the spacing of the stem electrodes have been formed in advance, a step in which the metal resistor sheet is etched to form a plurality of units each comprising a thin heating bridge wire and, connected at both ends of the heating bridge wire, heating electrodes wider than the heating bridge wire, and in which the heating electrodes are positioned above the said openings, a step in which the heating electrodes are welded to the stem electrodes, and a step in which the insulating sheet is cut so that single units comprising the heating bridge wire and the heating electrodes attached to both sides of this heating bridge wire remain on the insulating sheet.

BRIEF DESCRIPTION OF THE DRAWINGS

FIG. 3(a) is a cross-section view of a heating element, FIG. 3(b) is a plan view of the heating element.

DESCRIPTION OF THE PREFERRED EMBODIMENT

Figure 1:
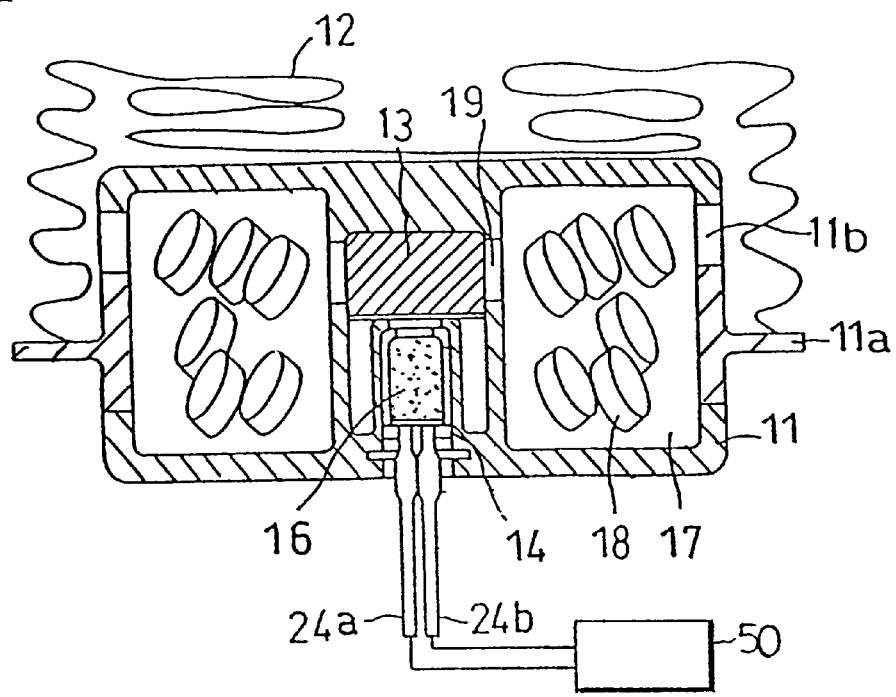
FIG. 1 is a cross-section view to explain the air bags used in this invention.

FIG. 1 illustrates an ignition device for header assembly used in an inflator system for an air bag in a car. A cylindrical container 11 is used as the inflator for generating gas, which is provided with a flange wall 11a so as to surround around the container. An air bag 12 is attached to the flange 11a to cover an upper part of the container 11.

In the center portion of the container, ignition material 13, i.e., potassium boronitrate, is charged and an ignition device 14 is arranged beneath and in contact with the material. the ignition device 14 comprises a stem 20 with a pair of stem electrodes 24a and 24b.

An ignitor charge 16 is loaded into the upper part of the ignition device 14 fitted with the stem 20. Furthermore, there is a space 17 around the ignition material 13 inside the container 11, and in the space 17 is loaded inflation gas-producing material 18 such as sodium azide, or like. The ignition material 13 and the space 17 are connected by a joining hole 19, and the space 17 and the air bag 12 are connected by a joining hole 11b.

In the above construction, if a vehicle fitted with the air bag is involved in a collision, electric current flows from the power source 50 through the stem electrodes 24a and 24b due to a collision detection signal, and the ignitor charge 16 in the ignition device 14 is ignited. Due to the ignition of the ignitor charge 16, the ignition material 13 located above the ignitor charge ignites, and a fire is started. This fire passes through joining hole 19, and ignites the inflation gas-producing material 18 in the space 17. When the inflation gas-producing material 18 ignites, gas is rapidly generated. The gas generated passes through the joining hole 11b and into the air bag 12, inflating the air bag 12.

Next, one embodiment of the header assembly containing an ignition device of this invention used in an air bag device will be explained with reference to FIG. 2.

The item labelled 21 is a cylindrical case sealed at one end, and an eyelet 22 has been fitted into the lower half of the inside of the cylindrical case. An ignitor charge 23 has been loaded into the space above the eyelet 22. Furthermore, two stem electrodes 24a and 24b, which pierce through the eyelet, are provided mutually separated at a distance. These electrodes are kept at a fixed distance apart by an insulating member 27 such as glass, or the like. In addition, the heating electrodes 25a and 25b at the two ends of the bridge element 25, which is layered on a flexible insulating sheet 26, are welded, and electrically connected, to the top ends of the stem electrodes 24a and 24b. The stem 20 is composed of the eyelet 22, the insulating member 27, and the stem electrodes 24a and 24b. The surface 20a of the stem 20 is flat, and the ends 241a and 241b of the stem electrodes 24a and 24b are substanitally flush. A combination of the bridge element 25 and the insulating sheet 26 constitutes a heating element 40.

It is essential that the stem surfaces are ground, reasons for this is so that the bridge element will be closely attached to the stem surface, and so, making use of the thermal conductance of the stem which is constructed of insulating material such as glass or ceramic, even if a small amount of noise current flows in the bridge element, the heat generated will be absorbed by the stem, and the ignitor charge will not ignite. When current flows through the bridge element, it must ignite the ignitor charge packed against it, but it must be insensitive to noise currents such as static electricity. The reason is that even if there is unevenness in the stem surface which contacts with the bridge element, there is no possibility of a wire break in the bridge element due to stress absorption by the flexible insulating sheet when the ignitor charge is packed in closely.

Figure 2:
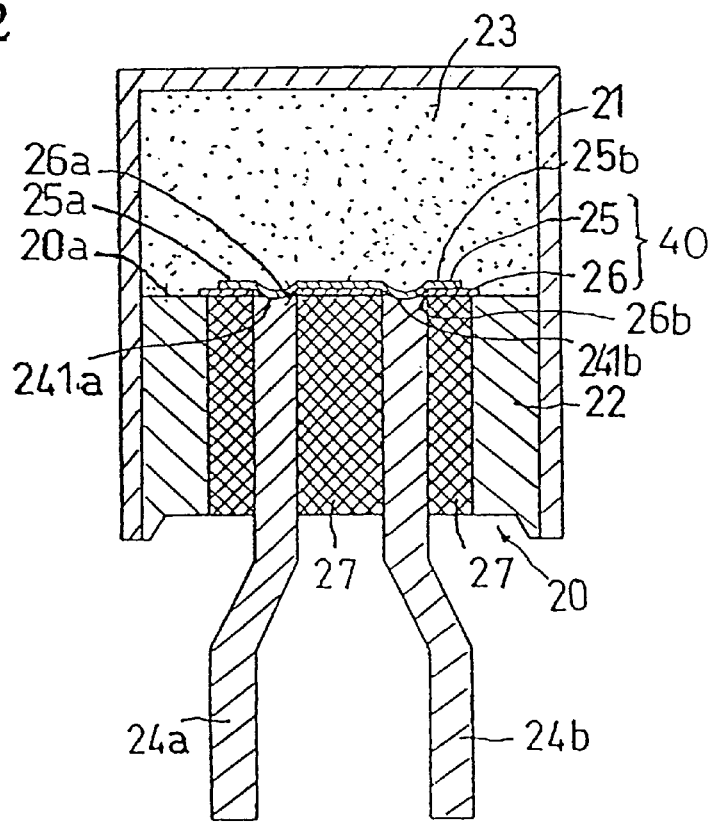
FIG. 2 is a cross-section view provided to explain an embodiment of this invention.
Figure 3A:
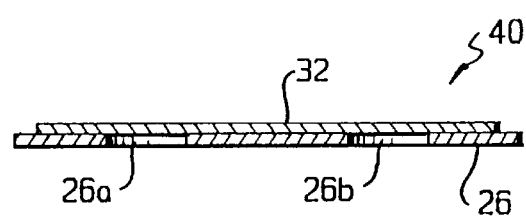
FIGS. 3(a) and 3(b) are provided to explain the steps of the manufacturing process of this invention.
Figure 3B:
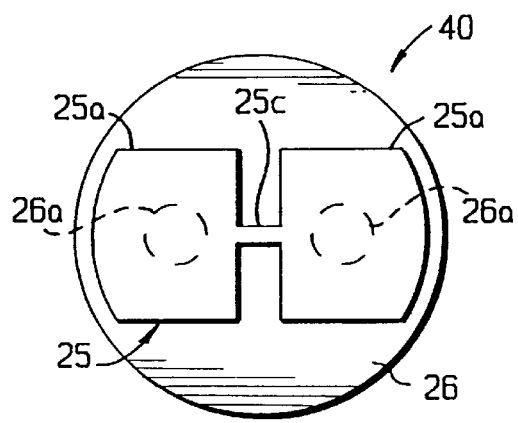

As clearly shown in FIG. 3(b), the bridge element 25 is a single metal resistor composed of a central narrow heating bridge wire 25c, and heating electrodes 25a and 25b which are formed in enlargement at both ends. The underside of the bridge element 25 is stretched out onto, and attached to, a flexible insulating sheet 26. Moreover, the heating electrodes 25(a) and 25(b) of the bridge element 25 are welded to the stem electrodes 24a and 24b, shown in FIG. 3(c), via openings (that is, connection guide holes) 26a and 26b in the flexible insulating sheet 26. The bridge element 25 is in close contact with the ignitor charge 23, which is omitted from FIGS. 3(a)–3(c) for clarity, but which is shown in FIG. 2.

Figure 3C:
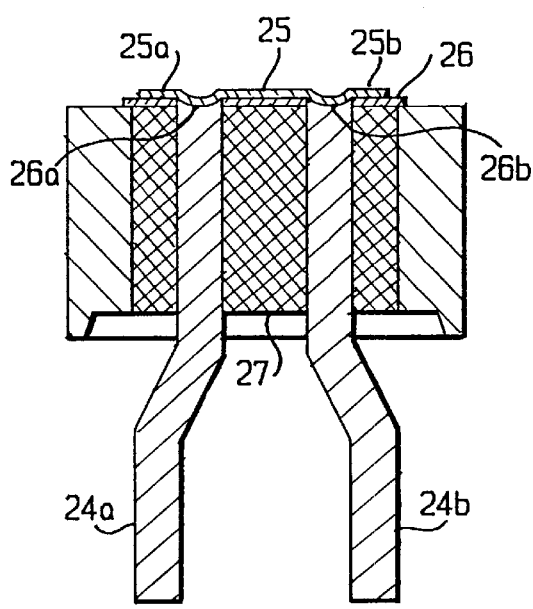
FIG. 3(c) is a cross-section view of an ignition device.

In the above construction, if, for example, the vehicle is involved in a collision, the collision is detected by a sensor, electric current flows between the stem electrodes 24a and 24b (shown in FIG. 3(c)) due to the resulting signal, and the heating bridge wire 25c of the bridge element 25 heats up and fuses due to this current. The ignitor charge 23 is ignited by the thermal energy released, the gas-producing material 18 (omitted from FIGS. 3(a)-3(c) for clarity, but shown in FIG. 1) caused to react, and gas produced.

Next, a method for manufacturing the said header assembly will be explained with reference to FIGS. 3(a) to 3(c). The parts of FIGS. 3(a) to 3(c) that correspond to FIG. 2 use the same symbols, so duplicate explanations will be omitted.

Firstly, as shown in FIG. 3(a), openings 26a and 26b are formed in the flexible insulating sheet 26 using a laser cutter, or the like, and a metal resistor sheet 32 is stretched out onto this flexible insulating sheet 26. A highly portable synthetic resin film, such as a polyamide, is used as the flexible insulating sheet 26, and metal foil with high specific resistance, such as NiCr, or the like, is used as the metal resistor sheet 32.

Next, photo-resist is printed on both surfaces, and the bridge element 25, possessing a heating bridge wire 25c, and heating electrodes 25a and 25b at both ends, is exposed to produce a narrow heating bridge wire 25c in the middle, and wide heating electrodes 25a and 25b at both ends, as shown in FIG. 3(b). Furthermore, the parts not needed are removed by development processing. Etching is carried out using ferric chloride, or the like, and the unwanted parts of the metal resistor sheet 32 dissolved away.

After that, the photo-resist on both sides remaining after exposure is removed by solvent, and moreover, the resin film is cut out into the desired (for example, round) shape, and finishing carried out to produce the bridge element 25, possessing a narrow heating bridge wire 25c and, connected to both sides of this heating bridge wire 25c, heating electrodes 25a and 25b which are wider than the heating bridge wire, as shown in FIG. 3(b). At this point, the openings 26a and 26b (shown by dotted lines) formed in the insulating sheet 26 are both positioned directly underneath the electrode parts 25a and 25b of the bridge element 25. Together, this bridge element 25 and the flexible insulating sheet 26 form the heating element 40.

Next, as shown in FIG. 3(c), the insulating sheet 26, joined to the bridge element 25, is stretched out onto, and attachment to, and the stem surface 20a, which is omitted from FIG. 3(c) for clarity but which is shown in FIG. 2, and which comprises the ends of the stem electrodes 24a and 24b and the surface of the insulating member 27. Furthermore, passing through the openings, e.g., connection guide holes, 26a and 26b formed in the insulating sheet 26, the stem electrodes 24a and 24b and the electrode parts 25a and 25b of the bridge element 25 are electrically connected by welding.

After that, an eyelet part 22, with the construction shown in FIG. 3(c), is inserted into a case (not shown) packed with ignition charge, and a header assembly with the construction shown in FIG. 2 completed. When the ignitor charge is brought into contact with the element, by means of the heating element 40 comprising the bridge element 25 located on top of a flexible insulating sheet 26, the closeness of contact is improved by the flexibility of the heating element, and the reliability of ignition increased. In the embodiment, after forming the openings 26a and 26b in the insulating sheet 26, etching of the metal resistor sheet 32 is carried out. However it is also possible to carry out etching of the metal resistor sheet 32 first, and then form the openings 26a and 26b in the insulating sheet 26.

In the embodiment, openings 26a and 26b are formed in the insulating sheet 26 in order to connect together the electrode parts 25a and 25b of the bridge element 25 and the stem electrodes 24a and 24b. However, rather than forming openings, it is also possible to cut out connection guides from the edge of the insulating sheet 26 that extend as far as the lower surface of the electrode parts 25a and 25b, and to electrically connect the stem electrodes and the electrode parts of the bridge element through these guides by welding.

Next, a method for the multiple manufacture of another embodiment of the heating element of this invention will be explained.

First, multiple sets of openings corresponding to the stem electrodes are formed in a single flexible insulating sheet with a large surface area.

Next, metal resistor film is pasted onto this flexible insulating sheet.

After that, this metal resistor film is etched by patterning using photosensitive resin, and a plurality of bridge elements formed, each with central part formed into a heating bridge wire and both ends formed into heating electrodes. The bridge elements are formed in positions aligned during patterning so that the heating electrodes are located at the openings in the sheet.

From the sheet on which the bridge elements have been formed, each bridge element is cut out in a specific shape, for example a disk shape, and multiple heating elements cut out, each of which comprises a portion of the sheet containing 1 bridge element.

By this means, heating elements 40 are obtained constructed of bridge elements 25 and pliable, flexible insulating sheet 26. As one example, in flexible insulating sheet 26 composed of 10 $\mu$m through 30 $\mu$m thick polyimide sheet, openings 26a and 26b are formed to correspond to the positions of the ends of the stem electrodes. Onto one side of this sheet is stretched out and attached a metal resistor sheet 32 comprising 5 $\mu$m through 20 $\mu$m thick NiCr foil. On puttering, a bridge element is formed with a heating bridge wire 25c that it is 0.5 mm through 2.0 mm long and 5 $\mu$m through 30 $\mu$m wide. The diameter of the individually cut out heating element disks is 5 mm $\phi$. The cut-out heating elements are positioned above the stem surface in alignment with the stem electrodes located at some distance apart on the stem surface, and the surfaces of the ends of the stem electrodes and the heating electrodes of the heating element are welded together via the openings.

A further embodiment, in which the stem electrodes have a co-axial structure, will be explained with reference to FIG. 4. The diagram of FIG. 4 does not show the case or the ignitor charge parts. The parts of FIG. 4 that correspond to FIGS. 2 and 3 use the same symbols, so duplicate explanations will be omitted.

This embodiment has a co-axial structure, wherein the stem electrode 24b is positioned approximately centrally, and the stem electrode 24b is surrounded by the insulating member 27. The bridge element 25 is formed by adhering a metal resistor sheet to a flexible insulating sheet 26 and then producing a specific pattern by etching. Accordingly, when the bridge element 25 is welded to the stem electrodes 24a and 24b, the insulating sheet 26 is located under the bridge element 25. As a result, even if there are depressions 27a, or the like, in the surface of the insulating member 27, and even if as a result there is a difference in level between the surface of the insulating material 27 and the surface of the stem electrodes 24a and 24b, this difference is absorbed by the flexibility of the insulating sheet 26, so shearing stress, and the like, does not occur in the fine heating bridge wire 25c of the bridge element 25, and product reliability is improved.

Next, a further embodiment of this invention will be explained with reference to FIG. 5. The diagram of FIG. 5 does not show the case or the ignitor charge parts. The parts of FIG. 5 that correspond to FIGS. 3 and 4 use the same symbols, so duplicate explanations will be omitted.

Figure 4:
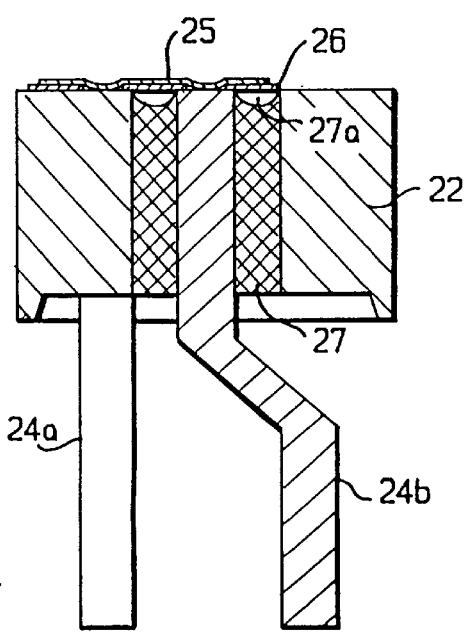
FIG. 4 is a cross-section diagram provided to explain another embodiment of this invention.
Figure 5:
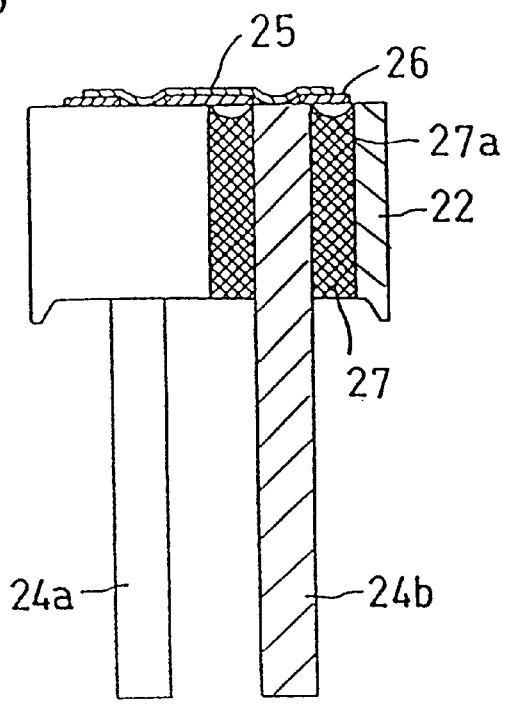
FIG. 5 is a cross-section view provided to explain another embodiment of this invention.

In this embodiment, unlike in FIG. 4, a stem electrode 24b of the stem 20 is displaced from the centre to the right of the diagram. However, this electrode is surrounded by an insulating member and the structure is similar to the co-axial structure. In this case also, even if there are depressions 27a, or the like, in the surface of the insulating member 27, and even if as a result there is a difference in level between the surface of the insulating material 27 and the surface of the stem electrodes 24a and 24b, this difference is absorbed by the flexibility of the insulating sheet 26, so shearing stress, and the like, does not occur in the fine heating bridge wire 25c of the bridge element 25, and a highly reliable product can be obtained.

Figure 6:
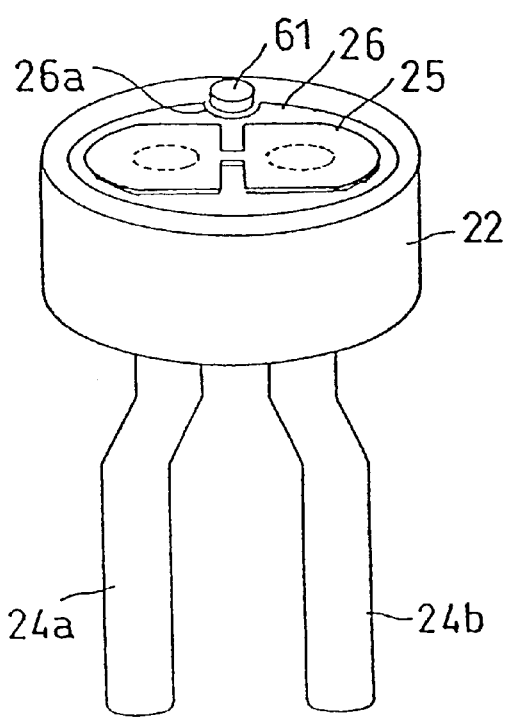
FIG. 6 is a diagonal view provided to explain another embodiment of this invention.
Figure 7:
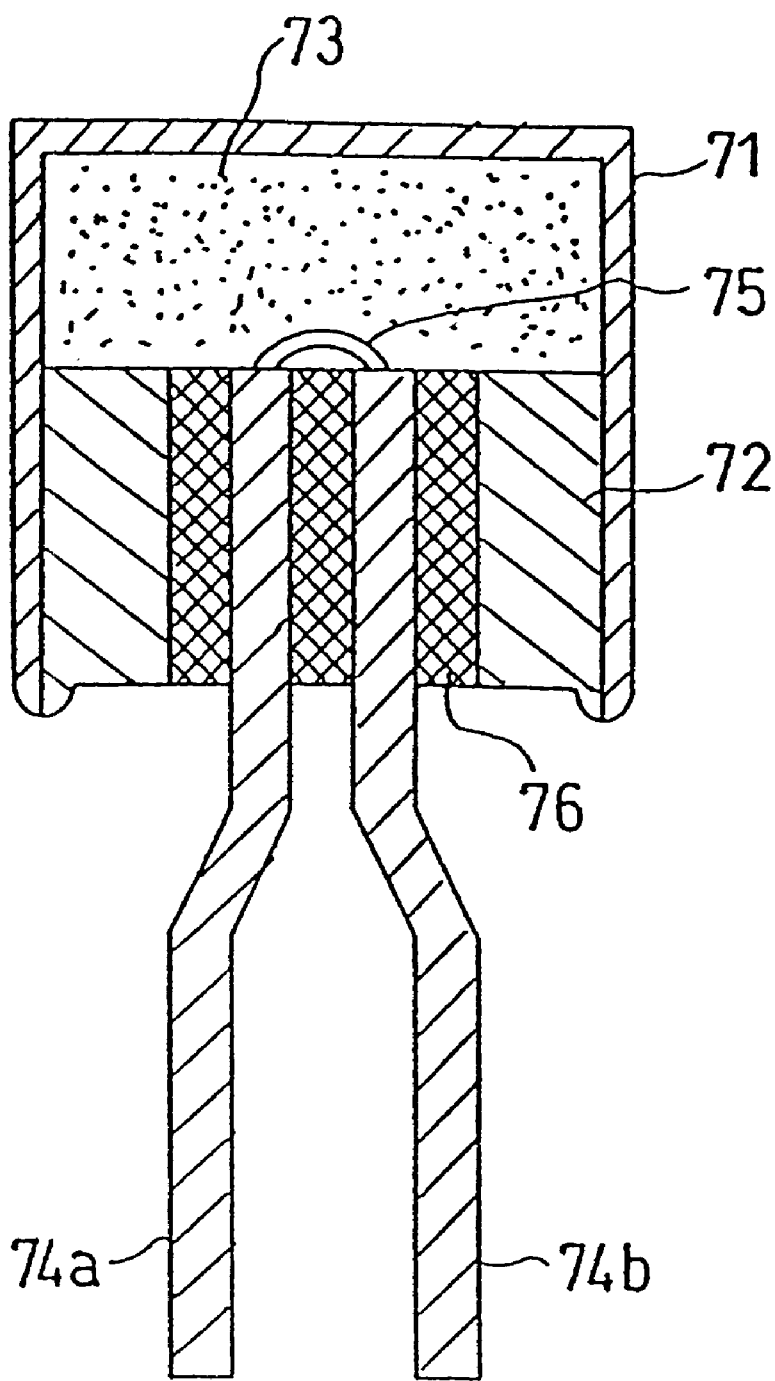
FIG. 7 is a cross-section view provided to explain an example of the prior art.

Next, a further embodiment of this invention will be explained with reference to FIG. 6. The diagram of FIG. 6 does not show the case or the ignitor charge parts. The parts of FIG. 6 that correspond to FIGS. 3~5 use the same symbols, so duplicate explanations will be omitted. In this embodiment, for example, a protuberance 61 is provided in part of the eyelet 22 of the stem. Furthermore, a cut-out area 26a is provided in part of the insulating sheet 26. In this case, the bridge element 25 can be accurately located in the correct position by positioning the cut-out area 26a to match the protruding part 61.

Using the construction, a metal resistor sheet and a flexible insulating sheet are joined. Next, the metal resistor sheet is etched, and a bridge element produced with a specific pattern, having a narrow heating bridge wire part and wide heating electrode parts. Furthermore, either before after being joined to the metal resistor, openings are formed in part of the insulating sheet, and using these openings which act as connection guides, the electrode parts within the bridge element, which have a large surface area, are welded to the stem electrodes. Accordingly, the bridge element is connected to the welding parts of the stem electrodes only, and does not make direct contact with the insulating member, or the like. As a result, if the distance between the openings formed in the insulating sheet are formed correctly, the distance between the welding parts of the bridge element is correctly established regardless of the dimensions and shape of the stem electrodes. This allows for a greater degree of freedom in planning the stem electrode parts. In addition, because the bridge element is composed of a metal resistor sheet, such as a foil, or the like, unlike bridge elements produced by deposition, sputtering, or the like, using this method it is possible to produce bridge elements with highly accurate resistance values and virtually no variation in thickness. For this reason, electrical properties also can be freely designed independently of the dimensions of the stem electrode parts. These factors are suitable for applications which require strict operation conditions such as air bags for use in automobiles, and the like.

In addition, in the technology of the prior art, because a fine, short bridge element is used, strict welding conditions are required, in relation to current density, thermal radiation, and the like, to ensure that the bridge element does not fuse when the bridge element and the stem electrodes are welded together. Using this invention, because welding to the stem electrodes occurs between two surfaces at the wide heading electrode parts of the bridge element, the welding strength is higher and the welding operation is simpler. Furthermore, because welding current is not applied to the fine heating wire bridge, weakening due to processing can be inhibited. Accordingly, processing costs are reduced and welding reliability increased.

Furthermore, the bridge element is joined to a flexible insulating sheet, as a heating element. As a result, the bridge element bends as a single unit in combination with the insulating sheet, which increases its mechanical strength, reduces breakage, and the like, during handling, and improves reliability. For example, even if shearing stress occurs because there are differences in level, and the like, in the welding surfaces of the stem electrodes, such shearing stress is absorbed by the insulating sheet. Also, even if stress occurs when packing in the ignited charge, after welding to the stem electrodes, because of the high mechanical strength of the bridge element, incidents of breakage, failure, and the like, can be prevented. In addition, because the insulating sheet is flexible, it can easily handle differences in level, and the like, in the welding surface of the stem electrodes. In addition, when a protuberance is formed in the eyelet part and a cut-out area is provided in the insulating sheet, this makes it easy to position the bridge element and the stem electrodes for welding.

Furthermore, if a plurality of bridge elements are formed on a single insulating sheet, and if, for example, each bridge element is cut out and separated after being welded and fixed to the stem electrodes, this increases productivity.

It is an essential condition that air bag devices used as safety equipment in automobiles operate correctly when the vehicle to which they are fitted is involved in an accident, so high reliability in the operation thereof is required. However, it is a property of air bag devices that they operate in self-destruct mode, due to the nature of header assemblies, and the like. As a result, little can be done to check the operation of air bag devices other than checking electrical conductance using a small current that will not ignite the ignition charge. Accordingly, high reliability is essential in header assemblies. Such higher reliability can be achieved by means of this invention. In addition, the bridge element is processed by the etching of a metal resistor sheet. Because of this, the shape of the heating bridge wire and the heating electrodes can be determined freely. For example, if the ignition properties change, adjustments can be made by changing the resistance value of the heating bridge wire. Using this invention it is possible to easily respond to changes in the resistance value by changing the master pattern used for etching, or changing the thickness of the metal resistor sheet. Furthermore, using this invention it is possible to adjust the welding position of the bridge element and the stem electrodes by changing the position of the openings formed in the resistor sheet. As a result, stem electrodes of various structures can be dealt with.

The above embodiments have been explained in terms of application to air bag inflators. However, this invention can also be applied to other safety equipment such as seat belt pretensions, and the like, and also to other devices.

By means of this invention it is possible to achieve highly reliable ignition device with superior mass production properties, and to implement methods of manufacture thereof.

What is claimed is:

1. Ignition device provided with a bridge element positioned on top of a stem, and heating carried out by passing an electric current through this bridge element from stem electrodes provided in the stem, in which the device comprising:

a stem comprising at least two mutually separated stem electrodes and an insulating element provided between these stem electrodes to insulate and maintain the stem electrodes and to form a stem surface in conjunction with the ends of the stem electrodes; and a heating element comprising a bridge element provided with a heating bridge wire and heating electrodes positioned at the both ends of the heating bridge wire, and a flexible insulating sheet positioned on top of the stem surface, on which the bridge element is supported, and in which openings or cut-out areas are formed as connecting guides corresponding to the position of the heating electrodes, wherein the connecting guides of the flexible insulating sheet are aligning with the ends of these stem electrodes, and the heating electrodes of the bridge element are electrically connected to the ends of the stem electrodes.

2. Ignition device of claim 1, wherein the bridge element comprises a metal resistor film.

3. Ignition device of claim 2, wherein the heating bridge wire of the bridge element is made narrower than the heating electrodes.

4. Ignition device of claim 2, wherein the bridge element and the flexible insulating sheet are used in contact with an ignitor charge.

5. Ignition device of claim 1, wherein the heating bridge wire of the bridge element is made narrower than the heating electrodes.

6. Ignition device of claim 5, wherein the bridge element and the flexible insulating sheet are used in contact with an ignitor charge.

7. Ignition device of claim 1, wherein the flexible insulating sheet is made of a synthetic resin.

8. Ignition device of claim 7, wherein the bridge element and the flexible insulating sheet are used in contact with an ignitor charge.

9. Ignition device of claim 1, wherein the bridge element and the flexible insulating sheet is used in contact with an ignitor charge.

10. Ignition device of claim 1, wherein the bridge element and the flexible insulating sheet are used in direct contact with an ignitor charge, and excess pressure exerted by the ignitor charge being relieved so as not to break the bridge element.

11. Method for manufacturing ignition device comprising:

- a step in which a metal resistor sheet is joined to a flexible insulating sheet in which a plurality of openings spaced to correspond to the spacing of the stem electrodes have been formed in advance;
- a step in which the metal resistor sheet is etched to form a plurality of units each comprising a thin heating bridge wire and, connected at both ends of the heating bridge wire, heating electrodes wider than the heating bridge wire, and in which the heating electrodes are positioned above the said openings;
- a step in which the heating electrodes are welded to the stem electrodes; and
- a step in which the insulating sheet is cut so that single units comprising the heating bridge wire and the heating electrodes attached to both sides of this heating bridge wire remain on the insulating sheet.

12. Method for manufacturing ignition device comprising:

- a step in which a plurality of openings, corresponding to the stem electrodes, is formed in the flexible insulating sheet;
- a step in which a metal resistor film is pasted onto a flexible resistor sheet;
- a step in which a bridge element is formed by patterning the metal resistor film so that the central part comprises a heating bridge wire and both ends comprise heating electrodes, and in which the heating electrodes are positioned at the location of the openings in the sheet;
- a step in which the sheet is cut to a specific shape so that the bridge element remains on it, to form a heating element comprising the bridge element and the cut out part of the sheet; and
- a step in which the heating element is combined with the stem electrodes, which are distributed at a distance from each other on the stem surface, and positioned above the stem surface, by welding together the heating electrodes of the heating element and the stem electrodes via the openings.

* * * * *